United States Patent [19]

Cook et al.

[11] 4,069,707
[45] Jan. 24, 1978

[54] BALANCE POINT DIAGNOSTICS FOR INTERNAL COMBUSTION ENGINE

[75] Inventors: James A. Cook, Feeding Hills, Mass.; Henry J. Mercik, Jr.; Lee R. Armstrong, both of Enfield, Conn.

[73] Assignee: United Technologies Corporation, Hartford, Conn.

[21] Appl. No.: 781,093

[22] Filed: Mar. 25, 1977

[51] Int. Cl.² ............................................. G01M 15/00
[52] U.S. Cl. ........................................................ 73/116
[58] Field of Search ...................... 73/117.3, 116, 118, 73/119 A

[56] References Cited

U.S. PATENT DOCUMENTS 3,592,053  7/1971  Lucia ..................................... 73/116

Primary Examiner—Jerry W. Myracle
Attorney, Agent, or Firm—M. P. Williams

[57] ABSTRACT

As used herein, the term "power" means a factor indicative of or related to horsepower, computed from acceleration and speed, with or without an empirically-determined inertia constant. A measurement of the operation of the governor of an internal combustion engine, such as a diesel engine having a primary distributing pump for providing fuel in a time related fashion to the fuel injectors, and in which fuel pressure is not an indication of governor operation, is the speed at which a line defined by two points measured on the power/speed characteristic of the engine intersects with an empirically-determined line emanating from the measured high idle speed point on the zero power speed abscissa of the power/speed characteristic. Two power measurements, each including time and speed, are made at different speeds as the engine accelerates with only its own drag, inertia and accessories as loads thereon. The difference therein, with or without horsepower calculations using an empirically-determined inertia constant, over the difference in speed provides the slope of an idealized, straight-line power/speed characteristic. An empirically-determined slope, with or without correction for the actual high idle speed measured, defines a second, idealized straight line indication of governor action in limiting fuel at high idle speed. From simply geometry, the intersection of these two straight line power/speed related representations is found as a measure of the balance point speed which is the speed at which the governor action begins.

6 Claims, 5 Drawing Figures

BALANCE POINT DIAGNOSTICS FOR INTERNAL COMBUSTION ENGINE

CROSS REFERENCE TO RELATED APPLICATIONS

The disclosure herein may use power measurements of the type disclosed in a commonly owned, copending application Ser. No. 747,759, ENGINE AIR-IN-FUEL DIAGNOSTICS, filed on Dec. 6, 1976 by Armstrong and Mercik. The apparatus disclosed herein may utilize a cylinder identification centering means disclosed and claimed in a commonly owned, copending application Ser. No. 684,221, ENGINE, CYLINDER IDENTIFICATION (CID) TRANSDUCER, filed on May 7, 1976 by Tedeschi now U.S. Pat. No. 4,043,189, and may determine the number of teeth on a flywheel for speed measurements in accordance with a commonly owned, copending application Ser. No. 684,037, DETERMINATION OF NUMBER OF TEETH ON AN INTERNAL COMBUSTION ENGINE FLYWHEEL, filed on May 7, 1976 by Stick et al now U.S. Pat. No. 4,015,466, or Ser. No. 747,755, WAVEFORM COUNT OF TEETH ON AN INTERNAL COMBUSTION ENGINE FLYWHEEL, filed on Dec. 6, 1976 by Pettingell et al.

FIELD OF ART

This invention relates to measuring and testing components of an internal combustion engine, and more particularly to electronic signal processing engine diagnostics for determining governor balance point speed.

BACKGROUND OF THE INVENTION

In internal combustion engines, particularly reciprocating diesel engines, it is common to provide a governor which limits the fuel flow to the engine as a function of engine speed. The governor is designed for any particular engine to limit the speed to a rated speed which, at rated, full horsepower, will ensure that the heat generated in the engine will not be excessive in contrast to the heat dissipating capability of the cooling system for the engine. As examples, a typical rated speed may be on the order of 2200 rpm, for a rated horsepower of on the order of 250 hp. The governor also prevents an unloaded engine from running away, since its action will severely reduce the fuel flow to the engine to that small amount which is accessory for a minimal power generation to overcome drag and accessory loading of the engine at idle. A typical high idle speed may be on the order of 2500 rpm; this differs from rated speed due to the fact that the fuel/speed characteristics of the engine when unloaded are different from those when loaded.

Diesel engines utilizing accurately timed fuel injection to control the timing of combustion are of several types. One type includes a fuel rail in which fuel at the desired pressure, for proper operation of the engine under its current load and speed conditions, is made available to all of the fuel injector systems by a gear pump, the pressure output of which is very nearly a linear function of the speed thereof. In such engines, it is possible to determine the governor cutoff point by determining the speed where fuel pressure drops as a result of governor action. Such a system is disclosed in a commonly owned copending application of Goodfriend et al, Ser. No. 684,329, filed on May 7, 1976, entitled FULL THROTTLE, SPECIFIC SPEED TESTS IN INTERNAL COMBUSTION ENGINE DIAGNOSTICS.

However, in another well known type of diesel engine, the fuel is provided to the various injectors by a primary pump, which combines the function of distributing the fuel in properly timed relationship to the revolution of the engine, with the function of providing the desired quantity to each injector. The fuel is provided to a primary pump by a transfer pump, which may typically comprise a gear pump, the output pressure of which may relate to engine speed, but the output of which is not controlled or limited by the speed-responsive action of the governor. In such an engine, it is not possible to determine the governor cutoff point by measurement of fuel pressure at any point in the system. Stated alternatively, since the fuel flow to the engine is controlled by regulation of the amount of fuel passed to the primary pump, rather than by the pressure of the fuel thereat, fuel pressure does not give an indication of the action of the governor in such systems.

One suggestion has been to place a linear displacement transducer (such as an LVDT), which senses extremely small linear displacements, in a position to sense the motion of the governor. However, the mounting of any additional sensor on engines, where each engine to be tested must be provided with brackets or the like, adds to the hookup time and increases the labor cost for each engine being tested. Additionally, such sensors are too delicate for a reasonable life expectancy in a rugged shop environment.

Obviously, since the action of the governor is to limit speed, one might think of monitoring speed as an indication of governor action; however, there is no clear cut, determinable point at which speed levels off, particularly where speed measurements will vary as a function of sub-cyclic speed fluctuations of the engine itself, transducer noise and the like. Thus, a speed profile is incapable of providing an indication of governor action to any degree of accuracy which would have diagnostic meaning.

SUMMARY OF THE INVENTION

Objects of the invention include provision of improved diagnostics for determining the operating characteristics of a governor on an internal combustion engine; and provision of governor diagnostics in an internal combustion engine in which fuel pressure is not controlled by the governor. As used herein, the term "power" means a factor indicative of or related to horsepower, computed from acceleration and speed, with or without an empirically-determined inertia constant.

According to the present invention, the governor balance point of an internal combustion engine is determined by causing the engine to undergo a burst acceleration, while loaded only by its own inertia, drag and accessories, from low idle to high idle; measuring power, with or without conversion by an empirically-determined inertia constant, at at least two speeds during the acceleration so as to define a first line by two points on the increasing power portion of the power/speed characteristic of the engine, measuring the high idle speed at the end of the acceleration, and determining the balance point speed as the intersection of said first line with a second line defined by an empirically-determined slope of the governor cutoff action, originating at the measured high idle speed. In accordance further with the invention, the power is measured by measuring two sets of speeds and time intervals indicative of acceleration at the average speed of each set, during the burst acceleration. In further accord with the invention, the empirically-determined governor cutoff slope is corrected as a function of measured high idle speed.

The invention provides a process of and means for determining governor operation from the actual, dynamic operating characteristics of the engine. The invention permits dynamic governor diagnosis without the need of an LVDT or the like. The diagnosis of the governor is reflective of the effect of the governor on the engine, in contrast to bench test conditions. The invention may be practiced as a sole test, or may readily be incorporated as but one test of many in an overall engine or vehicle diagnostic system, as disclosed herein. The concept of the invention may be implemented in a wide variety of fashions.

The foregoing and various other objects, features and advantages of the present invention will become more apparent in the light of the following detailed description of exemplary embodiments thereof, as illustrated in the accompanying drawing.

DETAILED DESCRIPTION

Figure 1:
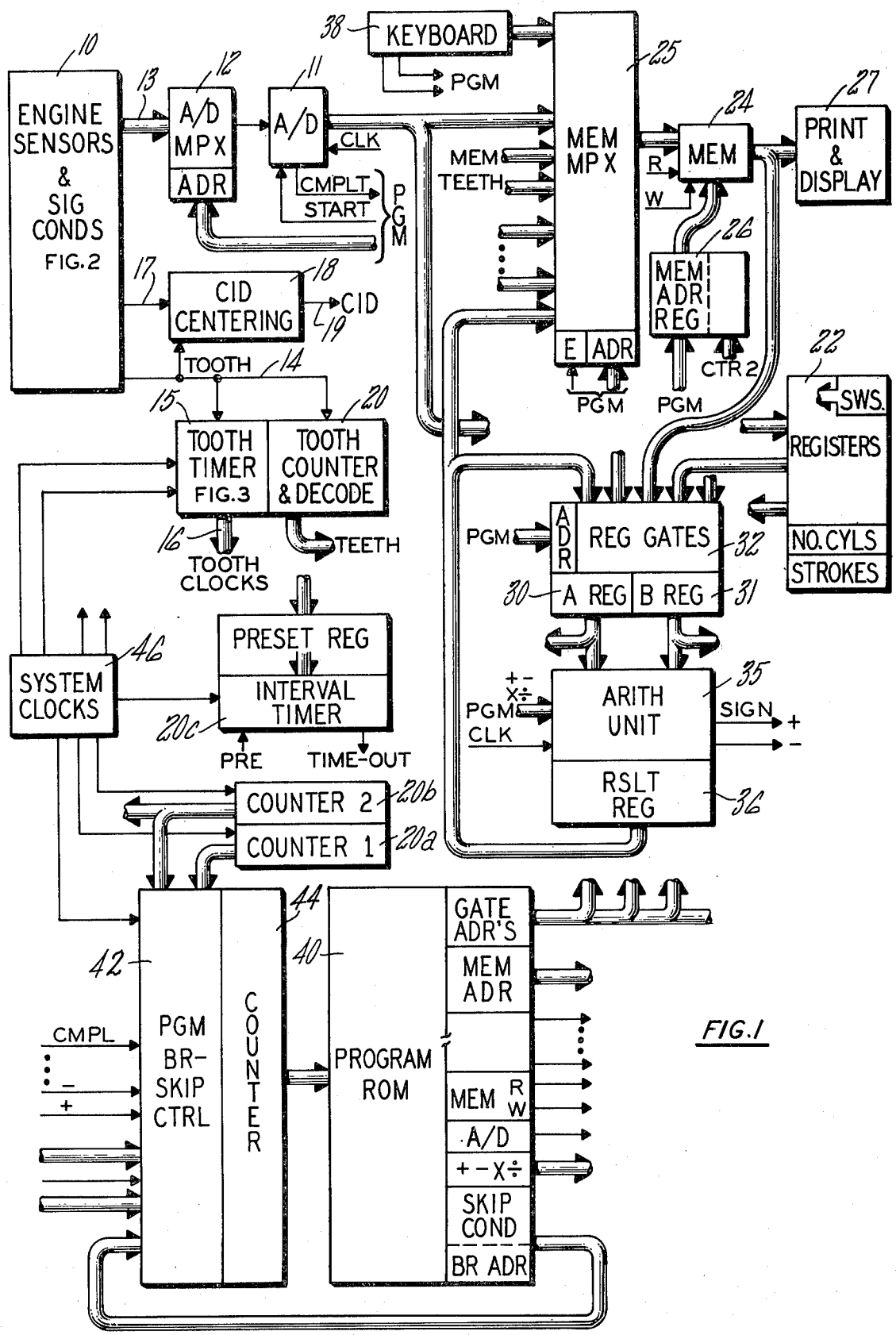
FIG. 1 is a simplified schematic block diagram of a diagnostic system including engine parameter sensing apparatus and exemplary electronic processing apparatus, in which the present invention may be incorporated.

Referring now to FIG. 1, a system which may incorporate the present invention is illustrated as representing the architecture of a typical data processing system or computer together with special purpose apparatus related to an engine diagnostic system of the type in which the invention may be incorporated. Specifically, the system incorporates engine sensors and signal conditioners 10 of a well known type which are adapted to be disposed for response to various parameters or discrete conditions on an engine under test, as described more fully hereinafter. Some of the sensors relate to pressures, temperatures and the like and are therefore analog signals, the magnitude of which is a measure of the parameter being sensed. These outputs of the sensors are fed over lines 13 to an analog to digital converter (A/D) 11 when selected by an A/D multiplexer 12 in response to a particular sensor address applied thereto by the program of the data processor. In addition, a tooth sensor may sense the passage of teeth on the flywheel of the engine to provide a tooth signal on a line 14, the intertooth time interval of which (when the engine is running) is measured by a tooth timer 15 and provided on tooth count lines 16. Another discrete signal is a cylinder or cycle identification signal (CID) on a line 17 which is applied to a CID centering circuit 18 to provide a CID signal on a line 19. The raw CID signal on the line 17 is a signal from a proximity sensor disposed to sense movement of an engine member once in each cycle of the engine, such as the rocker arm for the intake valve of one of the cylinders or a cam, if desired; this provides information of the cylinder-by-cylinder position of the engine at any moment in time in the same fashion as the number one firing in a spark ignition engine, and also provides cycle-to-cycle division of the engine's angular position as it is running or cranking.

In accordance with the invention, the parameters of the engine as provided through the A/D converter 11, and the instantaneous position information with respect to the engine as provided by the CID signal on the line 17 and the tooth signals on the line 14 may be used in diagnosis of the engine in accordance with the invention herein.

Additional special apparatus which may be used (although as described hereinafter is not necessarily required) includes a tooth counter and decode circuit 20, and a pair of counters 20a, 20b referred to as counter 1 and counter 2, and an interval timer 20c, and special purpose registers 22, which may be used (as an alternative to memory) to retain certain factors that are used so often as to render it advisable to have them directly available to the program rather than having to access them in memory, in order to cut down processing time and complexity of programming. Such registers may contain factors utilized in processing data (such as multiplicands used in digital filtering of the data and the like) and information relating to the particular engine under test (such as number of strokes and cylinders) which may be entered by switches manipulated by an operator, the switches feeding binary decode circuits such that the decode constantly reflects the position of the switch on a steady state basis in the manner of a register.

The remainder of FIG. 1 is illustrative of one type of data processing apparatus, which is shown for illustrative purposes herein since it is a type that may be advantageous for use where general purpose programming is not required, but rather limited functions are to be performed. A computer, as is known in the art, includes memory (accessible storage), and arithmetic unit, program control, and the necessary gates, data flow and event decode or monitoring circuits so as to permit advancing logically through the steps which are to be performed. Specifically, a memory 24 may be loaded from a variety of inputs shown on the data flow under control of a memory multiplexer 25 which is enabled and addressed by the program so as to select which of the possible inputs to memory are to be applied thereto, if any. The memory 24 is responsive to a memory address register 26 which may respond to a counter used in program control in a usual fashion. The output of the memory is available to other portions of the data flow, such as print and display apparatus 27 and the arithmetic apparatus including arithmetic unit input registers, referred to herein as an A register 30 and a B register 31 under control of register gates 32 which are controlled by the program in a known fashion. Herein, the output of the A register and the B register is available to the register gates 32 and to the main data flow, so that their contents may be moved between the registers 30, 31 or to the memory 24. This is to facilitate the particular type of processing which may be employed in an engine diagnostic system, as is described more fully hereinafter. The registers 30, 31 feed an arithmetic unit of a known type 35, the function of which, controlled by the program, is to add, subtract, multiply or divide, to provide answers to a result register 36 as well as providing indications of the sign of the result. As indicated in FIG. 1, the result register may be available at the input to the arithmetic unit through the gates 32; alternatively, as is common in many computers the result register could be automatically one of the inputs to the arithmetic unit, and it can be loaded directly from the memory upon a proper command.

In order to provide data inputs to the memory for initialization and to permit a degree of control over the system during processing, a keyboard 38 of a usual variety may be provided. In addition to data inputs, the keyboard may have control function keys that permit choice to the operator of loading memory from the result register or of loading memory in response to the keyboard, depending upon conditions which may be displayed in the print and display apparatus 27.

For the rather limited number of tests being performed in apparatus incorporating the present invention, the program may be controlled in a variety of ways. One way is a program ROM 40 which provides input gate addresses to control the inputs to the memory, the arithmetic input registers, and the A/D converter, etc.; the memory address; the functions to be performed by the arithmetic unit, and other commands such as commands to the memory to cause it to read or write, and to start the A/D converter 11, and the like. Sequencing is controlled by unconditional branch instructions (which provide a branch address) and by skip instructions (dependent on conditions) provided to a branch/skip control 42 at the input to the program counter 44, which is also responsive to system clocks 46. Thus, as is known, for each program clock signal received from the system clocks, the program counter may be advanced, skipped one or twice, or reset to the branch address, in dependence upon the presence of branch or skip instructions.

It should be understood that the particular processing apparatus used, and the degree of use of special purpose apparatus, is dependent upon the particular implementation of the present invention which is to be made, and forms no part of the present invention. If the invention is utilized in a complex, sophisticated diagnostic system in which a variety of diagnostic functions are required, then the type of apparatus selected for processing may be more sophisticated and capable of general purpose utilization in order to accommodate the special requirements of all of the diagnostic procedures to be performed. However, the cost of programming complexity of such a processing system may be unwarranted in a diagnostic system which performs either relatively few or relatively simple tests. As is more apparent in the light of detailed operational descriptions hereinafter, well known processing systems (such as NOVA and PDP/11) employing only programs provided through techniques well known in the art, may be utilized in conjunction with the engine sensors and conditioners 10, suitable input and output apparatus (such as keyboard 38 and the print and display apparatus 27) and, depending on the processing power of the data processing system selected, some special purpose hardware which may be found advisable, such as the tooth timer 15, the tooth counter 20 and some special registers 22. However, the well known processing systems referred to hereinbefore can provide adequate memory capacity to perform the tooth timing and counting functions, and to provide for the storage of all required parameters and engine information in the memory, as is readily apparent to those skilled in the art.

Figure 2:
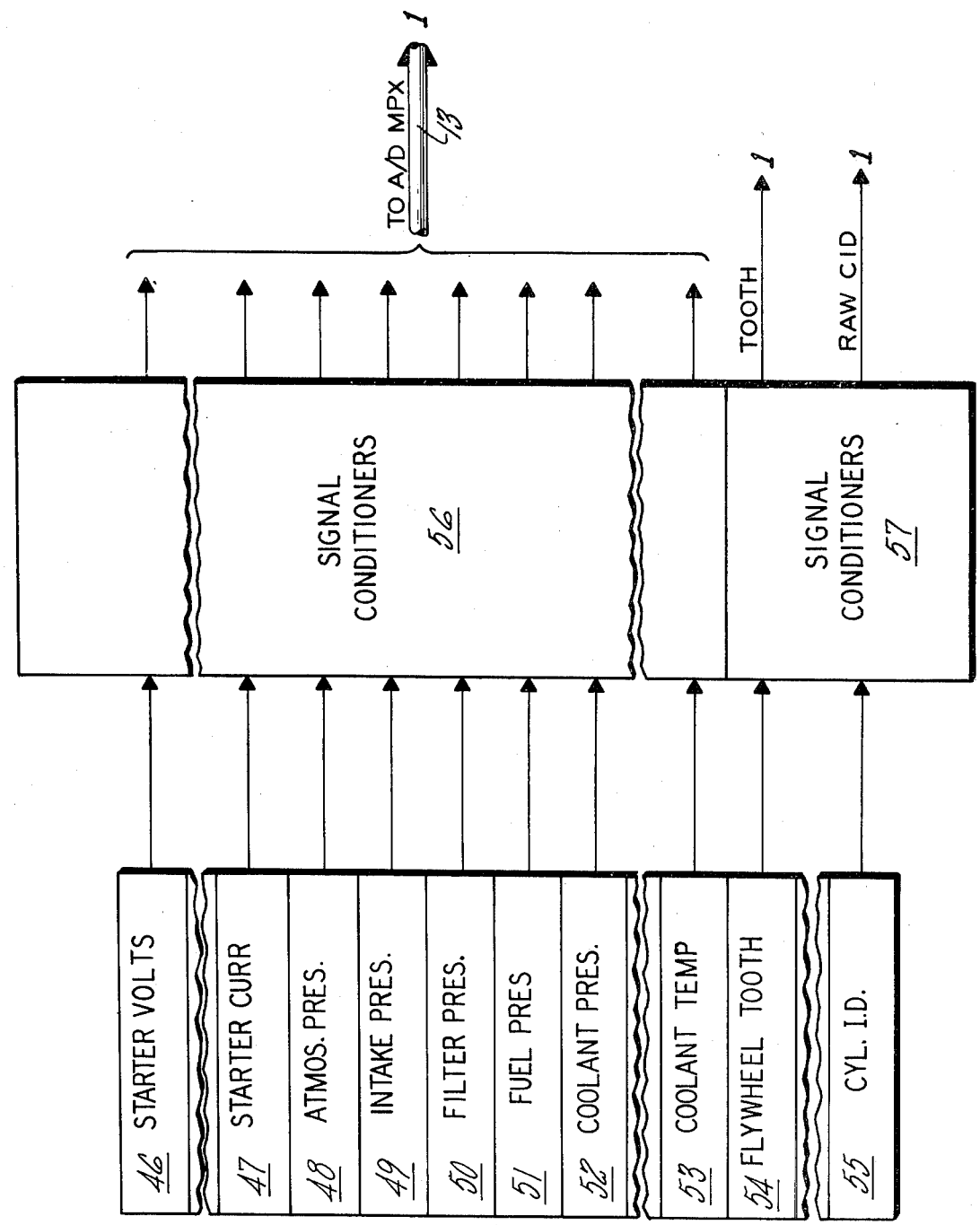
FIG. 2 is a simplified block diagram of engine parameter sensing apparatus for use in the embodiment of FIG. 1.

Referring now to FIG. 2, a plurality of engine sensors in a diagnostic system incorporating the present invention may include, among others not shown in FIG. 2, a starter voltage probe or clamp 46, a starter current probe 47, an atmospheric pressure transducer 48, which could be disposed in general proximity to the engine under test, a pressure transducer 49 to measure the intake manifold air pressure, a filter pressure transducer 50 to measure the pressure of the fuel downstream of the fuel inlet filter, a fuel pressure transducer 51 to measure the pressure at the fuel injector inlet rail of the engine, a coolant pressure transducer 52 which may preferably measure the pressure of coolant at the inlet to the coolant thermostat, a coolant temperature transducer 53 to measure coolant temperature, preferably at the inlet to the thermostat. In a diagnostic system incorporating the present invention there may also be a proximity sensor 54, which may comprise an RGT Model 3010-AN Magnetic Proximity Sensor, provided by Electro Corporation, Sarasota, Fla., for sensing the passage of flywheel teeth past a particular point adjacent to the flywheel housing, and a proximity sensor 55 such as a Model 4947 Proximity Switch distributed by Electro Corporation, for sensing the presence of an engine member which moves in a unique fashion once in each cycle of the engine, which is one revolution in a two stroke engine or two revolutions in a four stroke engine. The proximity sensor 55 may preferably be mounted through the valve cover adjacent to a rocker arm related to the intake valve of one of the cylinders of the engine, thereby to provide information as to the particular point of an engine cycle once in each cycle, as well as to delineate successive engine cycles as the engine is rotating.

Each of the sensors of FIG. 2 is applied to a suitable one of a plurality of signal conditioners 56, 57 to filter out unwanted noise, and to provide, through an amplifier, suitable level adjusting as is appropriate for the circuitry being fed thereby. For instance, the signal conditioners 56 scale the signals to the proper level so that each of them can be fed through a common A/D converter 12 (FIG. 1). The signal conditioners 56, 57 can be suitable ones of a wide variety known in the art, and form no part of the present invention.

Figure 3:
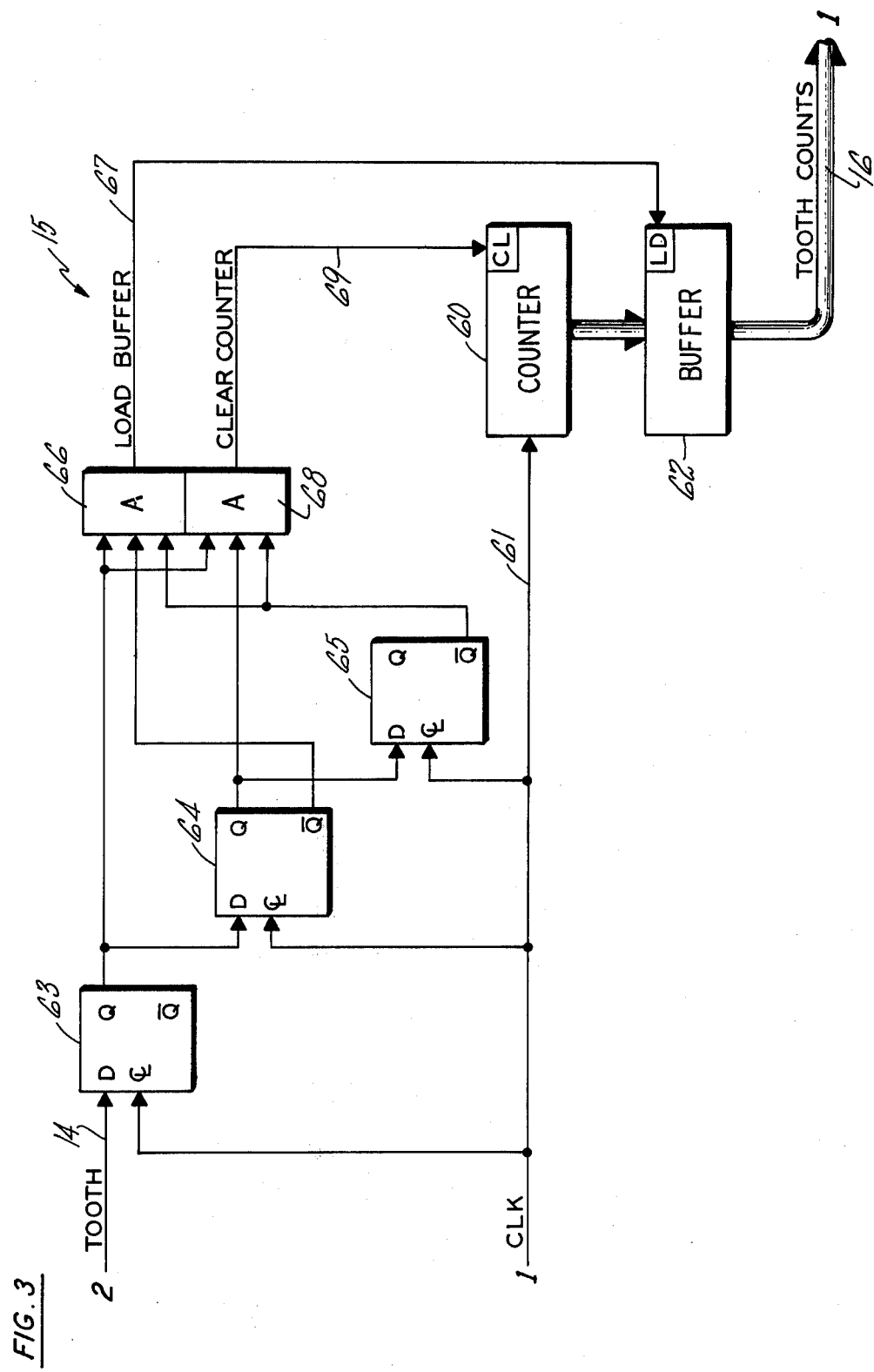
FIG. 3 is a simplified schematic diagram of tooth timer means for obtaining instantaneous, sub-cyclic engine speed in the embodiment of FIG. 1.

Referring now to FIG. 3, the tooth timer 15 includes a counter 60 which repetitively counts clock pulses on a line 61 that may be supplied by system clocks 46 in FIG. 1. The counter is parallel-fed to a buffer 62, the output of which comprises the tooth counts. The counter is running substantially all of the time since a very high frequency clock signal can be utilized on the line 61 (anywhere from tens of KHz to tens of MHz) whereas at speeds from 300 rpm to 2,000 rpm the frequency of the tooth signals on the line 14 may be on the order of 10 Hz to 100 Hz, depending upon the number of teeth. Thus the few clock signals lost during the tooth to tooth resetting of the counter are miniscule.

Each time that a tooth signal appears on the line 14, the next clock signal will set a D-type flip flop 63, the Q output of which is applied to a D-type flip flop 64. The second clock signal following the tooth signal therefore sets the D-type flip flop 64, and since its Q output is applied to a D-type flip flop 65 the third clock signal will cause it to become set. The very first clock signal, after the appearance of the tooth signal, is decoded by an AND circuit 66 since it responds to Q of flip flop 63 and not Q of flip flops 64 and 65; this provides a load buffer signal on a line 67 to cause the buffer 62 to be loaded in parallel from the counter 60. The second clock signal following the appearance of the tooth signal will cause an AND circuit 68 to respond to the Q of flip flops 63 and 64 and the not Q of flip flop 65 so as to generate a clear counter signal on a line 69 which is applied to the clear input of the counter 60 causing it to be cleared to zero. The third clock signal, by setting the flip flop 65, simply eliminates the clear counter signal on the line 69 so that the next leading edge of the clock signal and all subsequent clock signals will be counter in the counter 60. Whenever the tooth signal disappears, (which is totally immaterial) the next three clock signals in a row will cause resetting of the flip flops 63–65, in turn, since each of their D inputs will go down. The counter and the buffer are independent of the resetting of the flip flops 63–65 since both AND circuits 66, 68 operate only during a progression with flip flop 63 on and flip flop 65 off, which does not occur during the resetting of the flip flops.

Thus the tooth timer 15 provides tooth counts on the line 16 which are stable, throughout substantially each intertooth interval. The processing apparatus of FIG. 1 may therefore sample the tooth counts at random. The tooth timer 15 thereby provides very accurate, subcyclic speed measurement, on a tooth to tooth basis, which provides speed indications many times within each individual cylinder stroke portion of each engine cycle.

In the detailed description of exemplary processing hereinafter, the term "ringgear" is sometimes used in place of "flywheel"; they mean the same thing; the abbreviation "RGT" means "ringgear teeth," a stored factor indicating the number of teeth on the flywheel of the engine under test. This may be determined and entered from engine specifications, or as set forth in a commonly owned copending application of Stick et al, Ser. No. 684,037, entitled DETERMINATION OF NUMBER OF TEETH ON AN INTERNAL COMBUSTION ENGINE FLYWHEEL. Other abbreviations include: "RSLT" = result register; "MEM" = memory; "Ctr" = counter; "Factor" means a memory location or a register where the factor is available; "CMPLT" means A/D conversion is completed; "spd" means speed; and other abbreviations are apparent in the drawing. Parentheticals after "MEM," such as "(Freq)" indicate addresses, chosen at will by the programmer, or partially determined by counter two, if so indicated.

As used herein the term "power" means a factor indicative of or related to horsepower, computed from acceleration and speed, with or without an empirically-determined inertia constant. The basic description hereinafter is in terms of horsepower, and the horsepower/speed characteristic of an engine. However, as is described more fully hereinafter, by using an appropriately-adjusted empirically-determined governor cutoff slope, the power calculations need not have an empirically-determined inertia constant included therein.

Figure 4:
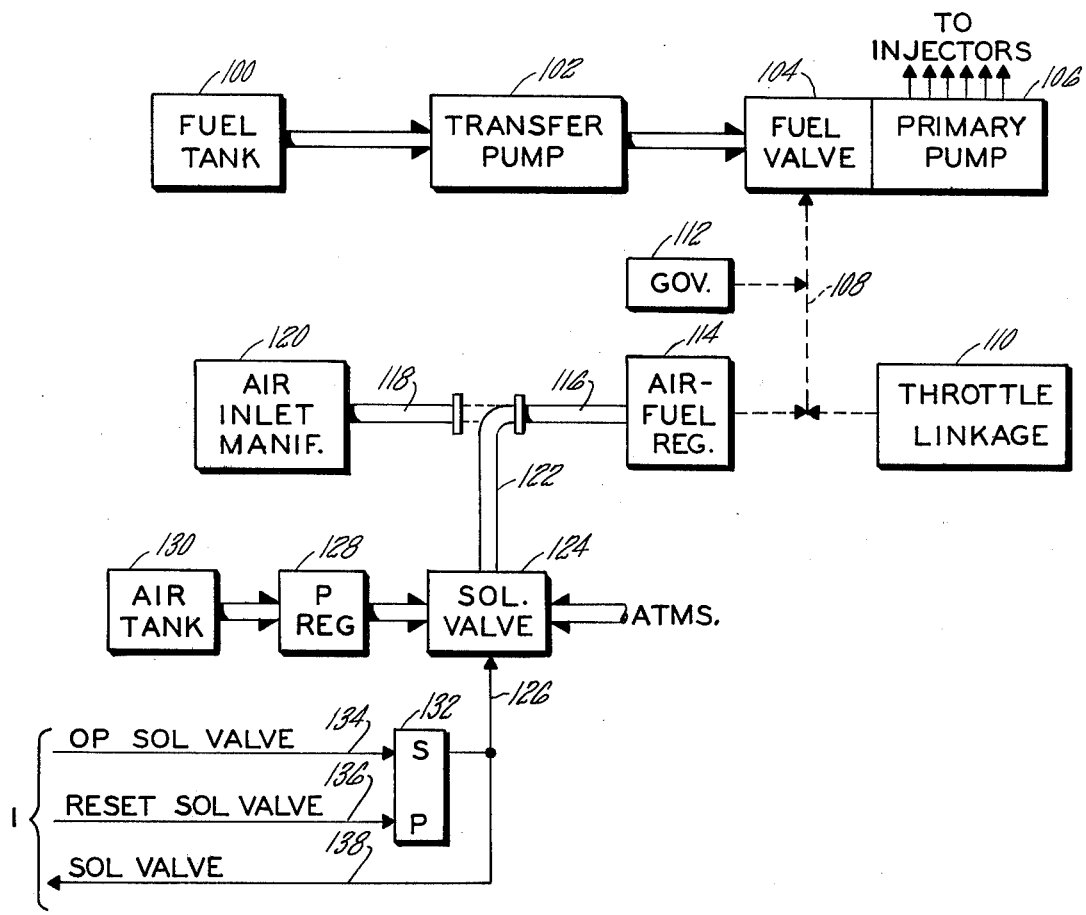
FIG. 4 is a simplified, schematic block illustration of a fuel system of an engine, with apparatus to force the air/fuel ratio regulator for a full fuel acceleration burst in accordance with the invention.

Referring now to FIG. 4, an engine fitted out for a balance point measurement in accordance with the present invention is shown in simplified block form. FIG. 4 illustrates, typically, a vehicle mounted diesel engine, for which there is a fuel tank 100 feeding a transfer pump 102 which in turn feeds the fuel valve portion 104 of a primary pump 106. The primary pump 106 serves as both a pressure-determining and time-determining distributing pump for providing fuel to the individual injectors related to the various cylinders of the engine. The amount of fuel which the primary pump 106 will accept for transfer to the injectors is determined by the fuel valve 104, which in turn is connected to a variety of linkage means 108. The linkage means 108 is connected in a well known fashion to throttle linkage 110, so as to permit control of engine fuel by means of an accelerator pedal or the like. But this linkage has limits on it which are provided by a governor 112 which, in response to the centrifugal force of rotating fly weights, or the like, limits the fuel to that which would provide rated speed under full power, or high idle speed when the engine is unloaded. The linkage means 108 is also controlled by an air-fuel regulator 114 which is normally connected by suitable duct means 116, 118 to the air inlet manifold 120 of the engine. In normal operation, if the air pressure is low in the air inlet manifold, the air-fuel regulator will limit the amount of fuel which is passed by the valve 104 to the primary pump 106, to avoid overfueling which results in lugging, smoking and fuel waste. On the other hand, when the turbocharger or other pressurized air inlet device provides air at high pressure to the air inlet manifold 120, the air-fuel regulator 114 allows full flow of fuel, subject to the throttle linkage 110 and the governor 112. For the test herein, an acceleration burst at substantially full fuel is required in order to test the governor action. That is, to provide a measure of where the governor cuts the fuel back from a full fuel condition requires that the air-fuel regulator 114 be defeated so as to permit maximum fuel flow during the acceleration. To this end, preparatory to performing the measurement in accordance with the present invention, the ducting 116, 118 is broken and a test duct 122 connects the air-fuel regulator duct 116 to a solenoid valve 124. The solenoid valve, will, when in a rest position, allow atmospheric air to communicate with the air-fuel regulator, thus causing the air-fuel regulator to limit the fuel passed through the valve 104; but when the solenoid valve is operated, such as by a signal on a line 126, the test duct 122 is connected by the solenoid valve 124 to a pressure regulator 128 which in turn is connected to a suitable source of air pressure 130, which may comprise shop air or the brake air tank of the vehicle in which the engine is mounted. The line 126 is energized by a bistable device 132 which is set in response to an addressable line 134 and reset by an addressable line 136. A line 136 is also addressable to indicate the condition (set or reset) of the bistable device 132, and thus the condition of the solenoid valve, by providing a signal indicating that the solenoid valve is not operated.

The pressure regulator 128 may typically adjust the pressure to on the order of 22 psig, which is roughtly equivalent to the rated pressure at the air inlet manifold 120 for full fuel flow. The governor 112 typically translates the throttle linkage on the order of 3/10 of an inch between full speed and low speed. This requires a very sensitive linear transducer, such as a linear variable differential transformer (LVDT), in order to sense such small motion, and such devices are not readily available in a form suitable for use in a rugged shop environment. One of the aspects of the present invention is avoiding the need for such a transducer in measuring the effect of the governor 112 in moving the linkage means 108.

Figure 5:
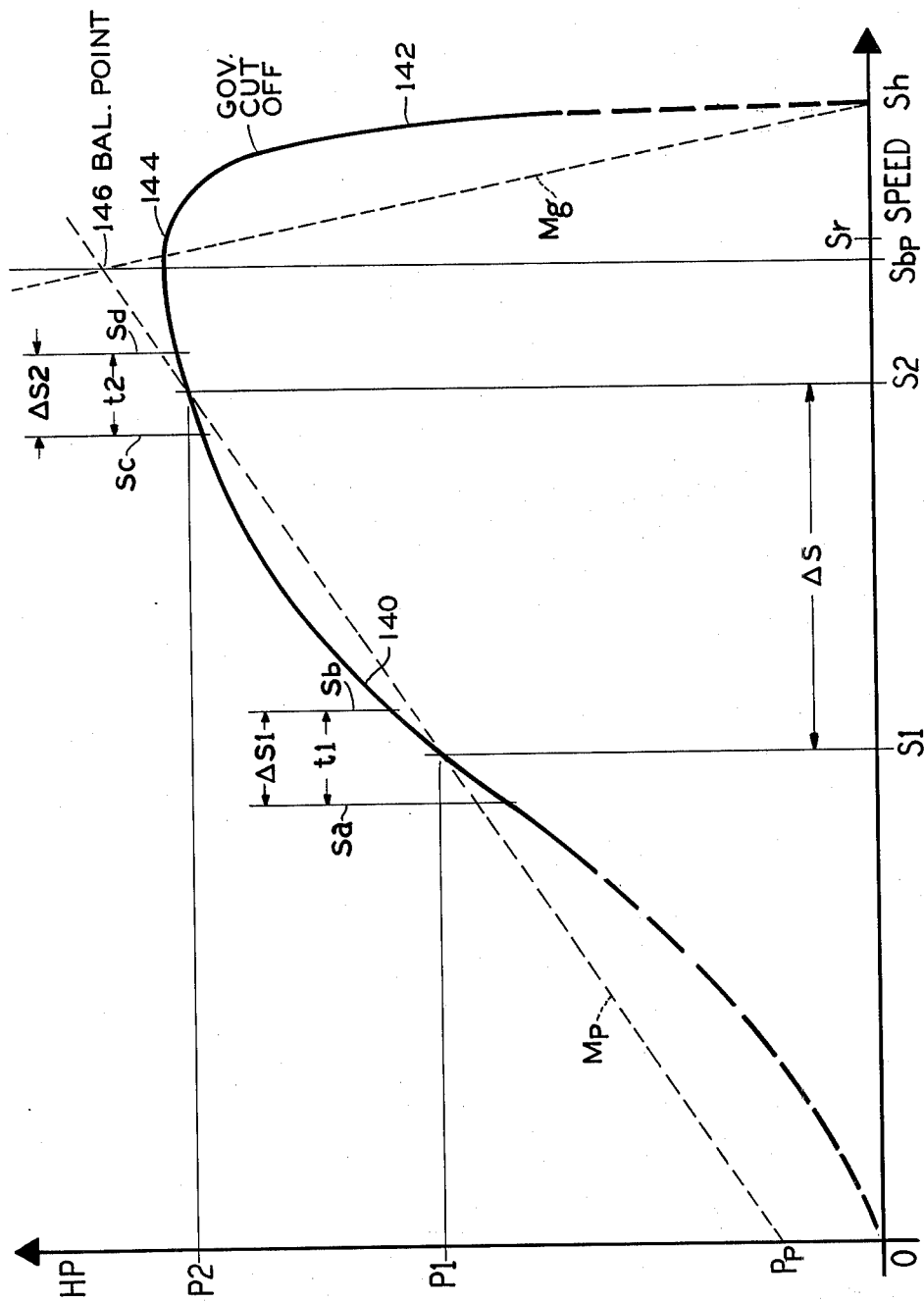
FIG. 5 is a simplified illustration of a horsepower vs. speed characteristic of an unloaded engine, illustrating the principles of the present invention.

Referring now to FIG. 5, the horsepower/speed characteristic of an internal combustion engine during a full-fuel acceleration burst, from low idle speed to high idle speed, while the engine is loaded only by its own inertia, drag and accessories, is illustrated by a heavy solid line having a power portion 140, characterized by increasing horsepower with increasing speed, and a governor cutoff portion 142 characterized by decreasing horsepower with increasing speed. As is known, the balance point 144 is the point at which the governor is allowing rated fuel delivery so that, under full power conditions, the engine will operate at rated speed and will deliver no more than rated horsepower.

The objective of this invention is to determine the balance point, which is normally expressed as a speed. The balance point speed (S$bp$) should ideally be at design rated speed for the type of engine under test, but is shown in FIG. 4 as slightly less than rated speed (S$r$) to emphasize the difference in actual balance point speed, to be measured herein, and the theoretical rated speed. And, the high idle speed (S$h$) is normally higher than rated speed simply because the governor's characteristic is designed to hold the engine to rated speed under full load, and allows a high idle speed somwhat higher than full load rated speed. As an example, an engine rated at 270 hp at 2200 rpm may have a high idle of 2450 rpm, and the two power/speed points may be on the order of 180 hp at 1100 rpm and 250 hp at 1600 rpm.

Looking at the horsepower/speed characteristic of an unloaded, accelerating engine as in FIG. 5, it may be implied that the balance point could be determined simply by measuring horsepower throughout the speed range from low idle to high idle speed. However, since horsepower must be measured by taking speed measurements over finite time intervals, this would require an extremely complex and intricate processing system to acquire speed indications at finite known times across the entire profile, together with extremely complex calculations to reduce the speed/time information to horsepower readings at the various speeds. Additionally, the indications of measured horsepower will vary in a random fashion sufficiently so as to hide the desired dropoff in the horsepower/speed relationship and therefor to hide the indication of operation of the governor at the balance point 144. This is due partly because of sub-cyclic speed variations within the engine, and partly because of the noisy signal characteristics of the transducers and signal processing circuitry and such. On the other hand, acquisition of speed and time measurements over a large number of difference acceleration bursts of the engine could provide, with filtering and averaging, a representative horsepower/speed characteristic for a given engine, but it would represent viable data only if the data were averaged for a very large number of different acceleration bursts. Obviously, this would take an undue amount of time for engine by engine testing, and render the commercial value of such a diagnostic procedure economically undesirable.

In the embodiment herein, the balance point (speed at which the governor action is just about to begin) is found by finding the intersection 146 of balance point speed with two intersecting slopes shown in dotted lines. Two power measurements (P1, P2) are made for two average speeds (S1, S2) and the difference in speed and power therefrom (ΔS, ΔP) is used to define the slope of an approximate, straight line power vs. speed characteristic, which is referred to herein as M$_p$ (which term is also used to define the slope of the approximate power/speed characteristic). When the slope is known, it can be used together with the speed S2 to extrapolate to the theoretical zero-speed power (P$p$).

In a similar fashion, when the high idle speed (S$h$) has been measured, an approximate slope line, which is referred to herein as M$g$, (which term is also used to define the slope of that line) is determined as a line having empirically-determined slope (or a slope determined by an empirical slope and a slope variation as a function of high idle speed, as described hereinafter). The two lines, so defined, are then used to calculate the balance point speed (S$bp$) where the two lines intersect. Derivation of this relationship uses a power value (P$bp$) to express equality in the power coordinate of the two lines M$p$, M$g$ at the balance point speed intersection:

$$Pbp = Pp + MpSbp = -Mg(Sh - Sbp) \tag{1}$$

$$Pp + MpSbp = -MgSh + MgSbp \tag{2}$$

$$Sbp(Mp - Mg) = -MgSh - Pp \tag{3}$$

$$Sbp = \frac{-MgSh - Pp}{Mp - Mg} = \frac{MgSh + Pp}{Mg - Mp} \tag{4}$$

Or, letting $-MgSh = Pg$ $$Sbp = \frac{Pg - Pp}{Mp - Mg} \tag{6}$$

The desired, empirical slope of the governor cutoff theoretical line Mg can be determined in several ways. For instance, for any given engine type which is known to be operating properly, a large number of horsepower readings can be made at a great variety of speeds from which, with averaging to accommodate noise and other variations, an accurate profile is made. From the accurate profile and the known balance point of a known good engine, the desired slope, Mg, can be determined by calculations or graphically. On the other hand, for a known, good engine of a given type, for which the theoretical balance point is known, trial slopes can be utilized that will, with power and speed measurements, calculate or correct, known balance point. Or, a standard engine can have a linear differential transformer mounted on it to determine the desired balance point, from which a useful slope can be defined for subsequent engine testing. In any event, the empirical slope Mg can be established for any given engine type to be used thereafter for testing engines of that type to determine the balance point (S$bp$) in accordance with the invention.

Following are exemplary instructions which might be utilized in acquisition of signals representative of the data required and processing of those signals so as to perform the measurement of balance point in accordance with the invention. It should be understood that the instructions presented are by way of illustration only, and indicate in general processing which may be implemented in the practice of the invention according to the exemplary embodiment shown herein. On the other hand, after particular processing apparatus is chosen, it should be apparent that the corresponding instructions necessary to cause that processor to implement the present invention will vary in dependence upon the processor so chosen; similarly, the detailed nature and particular order of performing some of the steps is immaterial to the overall result.

In the exemplary embodiment herein, a snap acceleration of the engine is caused when the procedure starts by displaying an indication to the operator to advance the engine speed from low idle to high idle; once the engine has reached a speed in excess of low idle, at which a meaningful power measurement could be made, it records the speed and starts a timer. In order to assure that the horsepower measurements are made accurately, a cyclic engine signal, such as the CID signal on the line 19 referred to hereinbefore, is used to synchronize all of the speed measurements, thereby eliminating any subcyclic engine speed variations. In response to CID, a first speed measurement is made concurrently with starting a timer, and after two additional CID signals are sensed, a second speed measurement is made and the timer is stopped. From the two speed measurements and the elapsed time indicated by the timer, a horsepower calculation is made for the average speed. Similarly, after several more CID signals, the process is repeated to find a second speed and the horsepower reading, which provide the points on the horsepower/speed characteristic, as illustrated in FIG. 5. And then, the processor determines that rated speed has been reached for a given period of time, thus allowing the engine to settle at a high idle speed; the high idle speed is then measured a number of times and averaged so as to provide a noise-free factor to work with, in determining the intersection of the slopes Mp and Mg. For a more accurate CID signal, the CID centering apparatus 18 of FIG. 1 may be in accordance with the aforementioned application of Tedeschi.

The test should start at low idle, with the solenoid valve 124 (FIG. 4) operated. Therefore, the first part of the test ensures solenoid valve operation and that the engine is at low idle by providing an indication to the operator to allow the engine to reach low idle, after which the speed of the engine can be tested to be sure it is at low idle. Therefore, the first instructions may be:

1. OP Sol Valve
1a. Display "LO"

Thereafter an indication can be displayed to the operator that the engine should be accelerated to high idle. Certain speed factors can be prepared while the engine is settling to low idle before testing. The speed measurements herein are made by the tooth timer, which senses the passage of teeth and records a count of the number of clock signals fed to a counter on a tooth-to-tooth basis. The fraction of a revolution traversed as each tooth passes the sensor is simply the ratio of one divided by the total number of teeth. The number of teeth on the flywheel may be determined by any suitable method, some of which are disclosed in the aforementioned applications of Stick et al and of Pettingell et al; or engine specifications may provide the count. The time for that fraction of a revolution to occur is simply the counts of the tooth timer divided by the frequency of clock signals fed to the tooth timer. Since frequency of the clock feeding the counter is expressed in Hz, and speed is normally expressed in revolutions per minute, factor of 60 must be employed in a well known fashion. To actually determine the speed from the counts provided by the tooth counter, the relationship is the ratio of one tooth to the total number of teeth, which is divided by the ratio of the counts to the frequency (the frequency in turn having to be first divided by 60 to yield a result in rpm's). Rewritten, this results in the frequency of the clock times 60, all of which is divided by the total number of flywheel teeth times the counts in the timer. This may be predetermined as a speed factor (so that any time a speed reading is required, it can be taken simply by dividing the speed factor by the number of counts in the timer) according to the following instructions:

2. Load MEM (Freq) to A REG
3. Load MEM (RGT) to B REG
4. Divide
5. Load RSLT to A REG
6. Load 60 Factor to B REG
7. Multiply
8. Load RSLT to MEM (Spd Factor)

On the other hand, when comparing the actual speed of the engine as determined by the tooth timer with predetermined speeds (such as a starting speed for horsepower measurement), one can reverse the position of speed and counts in the relationships described hereinbefore and determine in advance the number of counts which the tooth timer will have when the engine has a predetermined speed. This is done generally by multiplying the frequency of the clock times 60, all of which is divided by the product of the total number of teeth on the flywheel and the desired starting speed in rpm. This can be accomplished in the exemplary diagnostic system of FIG. 1 with the following instructions:

9. Load MEM (Freq) to A REG
10. Load MEM (RGT) to B REG
11. Divide
12. Load RSLT to A REG
13. Load MEM (Lo Idle Spd) to B REG
14. Divide
15. Load RSLT to B REG
16. Load 60 Factor to A REG
17. Multiply
18. Load RSLT to A REG Then the system can simply monitor the tooth timer counts, continuously subtracting the predetermined counts from the tooth timer counts. Since counts are larger for a lesser speed, if the speed of the engine is below a predetermined speed (such as low idle), then the predetermined counts will be less than the tooth timer counts, and this can be determined by doing a subtract and looking for a negative result as set forth in the following instructions:

19. Load Tooth timer to B REG
20. Subtract; Skip one if —
21. Branch to 19
22. Display Hi The system having determined that the engine is at low idle, it has, in instruction 22, commanded the operator to accelerate the engine to high idle. Speed factors are again brought out so as to be able to sense a speed in excess of high idle, which may for instance, be on the order of 1000 rpm. This may be done, in a fashion similar to that described with respect to instructions 9-21, as follows:

23. Load MEM (Freq) to A REG

24. Load MEM (RGT) to B REG
25. Divide
26. Load RSLT to A REG
27. Load MEM (Start Spd) to B REG
28. Divide
29. Load RSLT to A REG
30. Load 60 Factor to B REG
31. Multiply
32. Load RSLT to B REG Then the system can simply monitor the tooth timer counts, continuously subtracting the tooth timer counts from the predetermined counts. Since counts become smaller and smaller as the speed increases, when the speed of the engine exceeds the predetermined speed (e.g., 1000 rpm), then the predetermined counts will exceed the tooth timer counts and this can be determined by doing a reverse subtract and looking for a negative result as set forth in the following instructions:

33. Load Tooth timer to A REG
34. Subtract; Skip one if −
35. Branch to 33

In the exemplary embodiment of the present invention, two horsepower readings are made as one burst of acceleration is monitored, the precise starting of each horsepower measurement being in response to the presence of the CID signal. After the first CID signal above the start speed, speed is instantaneously read (instruction 38) and an interval timer is started; then one CID signal is allowed to pass (instruction 40) and after the second CID signal, speed is again instantaneously read and the interval timer is stopped (instruction 45). This may be accomplished herein according to the following pattern of exemplary instructions:

36. Skip one if CID
37. Branch to 36
38. Load Tooth timer to MEM (Sa)
39. Start Interval timer
40. Skip one if CID
41. Branch to 40
42. Skip one if CID
43. Branch to 42
44. Load Tooth timer to MEM (Sb)
45. Stop Interval timer
46. Load Interval timer to MEM (t1)

At this point in time, information which is very accurate has been derived and stored in memory relative to the first and second speeds (Sa, Sb, FIG. 5) and the time interval (t1) between them for a first horsepower reading (P1) at a first speed S1 (the average of the two speeds just recorded). And then six CID signals are bypassed, and on the third CID signal, speed and time readings are started for a second horsepower reading as follows:

47. Skip one if CID
48. Branch to 47
49. Advance Counter 1
50. Skip 1 if Counter 1 = 6
51. Branch to 47
52. Load Tooth timer to MEM (Sc)
53. Start Interval timer
54. Skip one if CID
55. Branch to 54
56. Skip one if CID
57. Branch to 56
58. Load Tooth timer to MEM (Sd)
59. Stop Interval timer
60. Load Interval timer to MEM (t2)

During all this time, the engine has been accelerating from low idle speed toward high idle speed. At some point in time, the governor will cut in and limit the speed to the high idle speed (Sh, FIG. 5). As the engine is continuing to accelerate up to high idle, certain additional calculations can be made from the measurements already taken. The horsepower at the first and second speeds can be calculated, the average speed for each horsepower reading can be calculated, the difference in the two speeds for which the horsepower measurements were made can be calculated, and the difference in the horsepower can be calculated. From all of this, as is seen in FIG. 5, the intersection Pp of the average slope of the advance power curve (Mp) with the zero speed ordinate can also be determined. When all of this is done, the only measurement remaining is the high idle speed, which is measured after the rated speed has been exceeded for some period of time, such as one second, then the remaining measurements can be made so as to determine the balance point in accordance with the invention.

The calculations which can be made from the speed and time readings already taken are essentially in accordance with the teachings of the aforementioned application of Armstrong and Mercik. Since speed is determined by the speed factor of instructions 2–8 divided by the counts sensed in the tooth timer, subtracting of the counts and then combination with other factors would be erroneous. Therefore, the speed must first be determined in rpm's before calculating horsepower. This may be done in accordance with the following instructions:

61. Load MEM (Sa) to B REG
62. Load MEM (Spd Factor) to A REG
63. Divide
64. Load RSLT to MEM (Sa)
65. Load MEM (Sb) to B REG
66. Divide
67. Load RSLT to MEM (Sb)
68. Load RSLT to A REG
69. Load MEM (Sa) to B REG
70. Subtract
71. Load RSLT to MEM (ΔS1)
72. Add
73. Load RSLT to A REG
74. Load Two Factor to B REG
75. Divide
76. Load RSLT to MEM (S1)

The foregoing instructions not only converted tooth counts to speeds, but also subtracted the speeds so as to provide ΔS1 and S1 (as indicated in FIG. 5) which are used as described hereinafter. Similarly, the speeds related to the second horsepower reading are also processed as follows:

77. Load MEM (Sc) to B REG
78. Load MEM (Spd Factor) to A REG
79. Divide
80. Load RSLT to MEM (Sc)
81. Load MEM (Sd) to B REG 82. Divide
83. Load RSLT to MEM (Sd)
84. Load RSLT to A REG
85. Load MEM (Sc) to B REG
86. Subtract
87. Load RSLT to MEM (ΔS2)
88. Add
89. Load RSLT to A REG
90. Load Two Factor to B REG
91. Divide
92. Load RSLT to MEM (S2)

Horsepower can then be determined from the relationship that torque is equal to the product of inertia times acceleration and horsepower equals the product of torque at the measured speed:

$$T = I\alpha = I\frac{(\Delta s)}{\Delta t} \qquad (7)$$

$$HP = TS = I\frac{(\Delta s)}{\Delta t} S(\text{avg.}) \qquad (8)$$

In this particular instance, the horsepower for the first speed, P1, is determined by inertia times the difference in speed across the time interval $t1$ times the average speed across the interval $t1$ as follows:

$$P1 = I\left(\frac{Sb - Sa}{t1}\right)\left(\frac{Sa + Sb}{2}\right) \qquad (9)$$

The inertia in this case is represented by a constant which is empirically determined for the particular engine under test, and normally is determined for a general horsepower measurement as that constant which provides the desired horsepower for a known engine of a given type, which constant is used for testing engines of similar types thereafter. This is known in the art and forms no part of the present invention. So, the horsepower readings can be determined as follows:

$$P1 = (K/t1)(\Delta S1)(S1)$$

$$P2 = (K/t2)(\Delta S2)(S2)$$

All of this may be in accordance with the following instructions, for example:

93. Load MEM (ΔS1) to A REG
94. Load MEM (S1) to B REG
95. Multiply
96. Load RSLT to A REG
97. Load MEM (t1) to B REG
98. Divide
99. Load RSLT to A REG
100. Load MEM (H.P. Constant) to B REG
101. Multiply
102. Load RSLT to MEM (P1)
103. Load MEM (ΔS2) to A REG
104. Load MEM (S2) to B REG
105. Multiply
106. Load RSLT to A REG
107. Load MEM (t2) to MEM (P1)
108. Divide
109. Load RSLT to A REG
110. Load MEM (H.P. Constant) to A REG
111. Multiply
112. Load RSLT to MEM (P2)

Now the slope Mp for the horsepower profile can be determined as the change in horsepower (ΔP) over the change in speed (ΔS) where ΔS is the difference between S2 and S1, as follows:

113. Load MEM (S2) to A REG
114. Load MEM (S1) to B REG
115. Subtract
116. Load RSLT to MEM (ΔS)
117. Load MEM (P2) to A REG
118. Load MEM (P1) to B REG
119. Subtract
120. Load RSLT to A REG
121. Load MEM (ΔS) to B REG
122. Divide
123. Load RSLT to MEM (Mp)
124. Load RSLT to A REG The slope of Mp of the primary power speed characteristic has been generated and is in memory, and is also available in the A register for use in calculating the intersection of the slope line at the nominal zero speed horsepower Pp, as follows:

125. Load MEM (S1) to B REG
126. Multiply
127. Load RSLT to B REG
128. Load MEM (P1) to A REG
129. Subtract
130. Load RSLT to MEM (Pp)

Now all of the parameters defining the primary horsepower/speed characteristic as illustrated in FIG. 5 are available in memory.

By this time, the engine may have reached high idle (Sh); to determine when a stable high idle has been reached, a check is made to be sure that the engine speed is higher than rated speed (Sr) for a period of one second, which may be done as follows:

131. Load Interval timer Preset REG (1 Sec)
132. Load MEM (Freq) to B REG
133. Load MEM (RGT) to B REG
134. Divide
135. Load RSLT to A REG
136. Load MEM (Sr) to B REG
137. Divide
138. Load RSLT to A REG
139. Load 60 Factor to B REG
140. Multiply
141. Load RSLT to B REG
142. Load Tooth timer to A REG
143. Subtract
144. Skip two if —
145. Display "Hi"
146. Branch to 142
147. Start Interval timer
148. Skip one if time out
149. Branch to 148
150. Load Tooth timer to A REG
151. Subtract
152. Skip one if —
153. Branch to 142

The processor has now determined that the engine has been above rated speed for at least one second, and it will now take the average of eight speed readings to use as high idle speed (Sh):

154. RESET Counter 2
155. Load MEM (Spd Factor) to A REG
156. Advance Counter 2
157. Load Tooth timer to B REG
158. Divide
159. Load RSLT to MEM (Spd. Ctr. 2)
160. Skip one if Counter 2 = 8
161. Branch to 156
162. Display "Lo"

Now there are eight speed measurements stored in a block which has been indexed by counter 2. This completes gathering data during the acceleration burst so instruction 168 has indicated to the operator that he can now allow the engine to resume low idle.

Then the eight speeds are averaged so as to provide a measure of the high idle speed, which may be as follows:

163. Reset Counter 2
164. Reset A REG
165. Advance Counter 2
166. Load MEM (Spd-Ctr. 2) to B REG
167. Add
168. Load RSLT to A REG
169. Skip one if Counter 2 = 8
170. Branch to 165
171. Load Counter 2 to B REG
172. Divide
173. Load RSLT to MEM (S$h$)

Now there is stored in memory an average of eight high idle speeds which is used as the high idle speed in the further calculations.

In order to complete a measurement of balance point, as an indication of governor health according to the invention, an empirically determined slope for a theoretical governor cutoff line is extracted from memory. In one embodiment of the invention, this slope may be used as extracted, without regard to the sensed parameters. In a second embodiment of the invention, however, the empirically determined slope may be corrected, as described hereinafter, depending upon the particular, measured high idle speed in comparison with an empirically determined, or design-specified high idle speed which is normal or ideal for an engine of the type under test. Various methods of correction may be utilized, but since the correction required is a relatively small function of the difference of the actual high idle speed from a design high idle speed for the engine under test, the particular method utilized is not critical, the correction being of a second order of magnitude in importance. In accordance with the second embodiment, the empirically determined governor cutoff slope MG, which for the 270 hp exemplary engine referred to hereinbefore may be equal to −1.67, has added to it the product of (1) a correction factor (ΔM), which in this example may be on the order of −0.0074 (which is empirically determined in the same fashion as the factor MG), and (2) the difference between the actual measured high idle speed (S$h$) and a theoretical or ideal high idle speed (SH) for engine of the type under test (which in this example may be on the order of 2450 rpm). It should be noted that the actual high idle speed will vary from the design high idle speed as a consequence of various factors such as: misadjustment of the high idle; the air/fuel ratio; or a worn governor, all of which affect the actual balance point of the governor.

Thus, a corrected governor cutoff slope M$g$ may be determined by instructions of the type as follows:

174. Load RSLT to A REG
175. Load MEM (SH) to B REG
176. Subtract
177. Load RSLT to A REG
178. Load MEM (ΔM) to B REG
179. Multiply
180. Load RSLT to A REG
181. Load MEM (MG) to B REG
182. Add Now the slope, M$g$, as correct in accordance with the second embodiment of the invention, is available in the result register so that it may be used in the calculation of balance point speed, S$bp$, as is described with respect to FIG. 5 and equations (1)–(4) hereinbefore. The following instructions are exemplary of finding S$bp$ in accordance with the last expression of equation (4) hereinbefore:

183. Load RSLT to A REG
184. Load MEM (M$p$) to B REG
185. Subtract
186. Load RSLT to MEM (M$p$)
187. Load MEM (S$h$) to B REG
188. Multiply
189. Load RSLT to A REG
190. Load MEM (P$p$) to B REG
191. Add
192. Load RSLT to A REG
193. Load MEM (M$p$) to B REG
194. Divide
195. Load RSLT to MEM
196. Load RSLT to DISPLAY Thus, in instructions 195 and 196 the balance point speed, S$bp$, has been made available in memory and for display. Although this provides a principle measure of governor operation, it also may be used in further diagnostic procedures, which form no part of the invention herein, if desired.

As an alternative, the steps performed in instructions 174–182, to correct the empirical slope MG can be eliminated if found to be unnecessary in any given embodiment of the invention. This may be true in most cases if the high idle speed is adjusted before making the governor balance point measurement in accordance with the invention. Then the determination of balance point in accordance with equation (4) as set forth in instructions 183–196 can be made with the uncorrected slope, if desired. On the other hand, a simplistic correction could be made with an uncorrected slope, MG, by simply performing the steps 183–196 and then adding or subtracting the difference between the measured high idle speed (S$h$) and the empirical high idle speed (SH) from the calculated balance point speed S$bp$ provided in instructions 183–196; this gives a partially corrected balance point speed which may suffice in some cases. And it should be understood that since an empirical slope MG is used as an integral part of the measurement made in accordance with the present invention, it can be adjusted so as to provide desired results indicative of operating condition of the governor for any type of engine under test. Stated alternatively, by suitably adjustment of the empirical slope MG, and particularly with a suitable correction factor ΔM, all of which can be selected empirically, a good indication of the operating characteristic of the governor by means of a reasonably informative measurement of balance point speed S$bp$ can be made in a variety of ways in accordance with the invention.

Instead of solving the last expression of equation (4), the present invention may alternatively be practiced by solving equations (5) and (6). The type of processing steps required is very similar to that described hereinbefore with respect to the solution of equation (4). Similarly, in establishing the first speeds for taking horsepower, instead of testing for a beginning speed and then waiting for the first CID to take the first horsepower speed, speed could be sensed after each CID signal until a sensed speed exceeds the starting speed, and that speed could be used as the first speed for the first horsepower measurement. Similarly, the number of revolutions (related to CID signals herein) between the measurements of speed for each horsepower measurement, and the number of revolutions between successive horsepower measurements can be varied. And, other methods of separating the two horsepower measurements could be used; for instance, a simple time delay could be used, or, a second threshold speed could be sensed; none of these factors are critical to the practice of the invention so long as a reasonable straight line approximation of the advancing horsepower/speed characteristic is made. The particular speeds chosen will alter the slope M$p$ of the increasing power/speed characteristic, which would require a different theoretical slope M$g$ for the particular type of engine under test in order that the intersection of the two slopes would still fall on the balance point speed. The invention herein doesn't relate to the particular speeds or the particular method of separation of the two horsepower measurements, so long as a reasonably workable slope M$p$ is found which can be utilized with an empirical slope, with or without high idle speed correction. This is obviously so since the need for correcting the empirical slope MG as a function of the actual high idle speed so as to find a better empirical slope M$g$ can be eliminated by first operating the engine at high idle speed and adjusting it to the theoretical high idle speed for which the empirical slope MG has been chosen.

As described hereinbefore, the use of an empirically-determined inertia constant (K, in equations (10) and (11), hereinbefore), need not actually reflect inertia so as to give horsepower readings actually indicative of horsepower of the engine; it is enough that calculations be performed that are horsepower related, if suitable adjustment is made in the actual value of the governor cutoff slope used to find the second line for intersection with the line defined by the two horsepower-related indications. For instance, if K represents simply the one half factor to provide average speed as described hereinbefore, then the empirical constant used to define the governor cutoff slope would be divided by the empirically-determined portion of the inertia constant, in an obvious, arithmetic fashion. However, since the comprehensive diagnostic system will normally include a complete horsepower calculation, it is sometimes simpler simply to call for the horsepower calculations than it would be to devise a test just eliminating the use of the empirical constant. On the other hand, it may be more difficult to practice the invention in a system which does not have an empirical constant for the engine under test; in such a case, only an empirically-determined governor cutoff slope constant need be provided in order to practice the present invention. In such circumstances, therefore, the use of the invention would not be precluded by the absence of an available empirically-determined inertia constant. Thus, the term "power" used hereinbefore, means horsepower-related, whether or not the inertia constant is employed with suitable adjustment in the empirically-determined governor cutoff slope. And, as used herein, horsepower-related means the same thing as power (with or without the inertia constant). Since the governor cutoff slope constant is empirically-determined, it can be as easily determined for use with measurements made, whether or not the calculations for finding the two horsepower/speed points involve the inertia constant.

Similarly, although the invention has been shown and described with respect to exemplary embodiments thereof, it should be understood by those skilled in the art that the foregoing and various other changes, omissions and additions in the form and detail thereof may be made therein and thereto, without departing from the spirit and the scope of the invention.

Having thus described typical embodiments of our invention, that which we claim as new and desire to secure by Letters Patent of the United States is:

1. In a method of determining the balance point speed of the governor of an internal combustion engine while mounted on the engine with the engine running, the steps of:
   providing an empirically-determined governor cutoff slope for an engine of the type under test;
   accelerating the engine from a low speed to high idle speed with the engine loaded only by its own inertia, drag and accessories, and measuring two indications of power and corresponding speeds which define two points on the increasing power portion of the power/speed characteristic of the engine as it accelerates;
   measuring the high idle speed of the engine after it accelerates; and
   determining the balance point speed of the governor as the speed at which a first line defined by said two points on the power/speed characteristic intersects with a second line emanating from the high idle speed point along the zero power speed abscissa of the power/speed characteristic of the engine and defined by said empirically-determined governor cutoff slope.

2. A method according to claim 1 wherein said determining step comprises correcting said empirically determined governor cutoff slope as a function of measured high idle speed before determining the intersection of said second line and said first line.

3. Apparatus for measuring the balance point speed of the governor of an internal combustion engine with said governor mounted on the engine, while the engine is accelerated from a low idle speed to a high idle speed in a burst acceleration with the engine loaded only by its own inertia, drag and accessories, comprising:
   speed sensor means, including means adapted to be disposed for sensing angular rotation of the engine, for providing a speed manifestation indicative of the rotary speed of the engine;
   slope means for providing a manifestation of an empirically-determined governor cutoff slope; and
   processing means operative in response to said speed manifestation with said speed sensor means disposed to sense the angular rotation of said engine and to said slope means, for providing a plurality of indications of the instantaneous speed of the engine dispersed in time along the increasing portion of the power/speed characteristic of said engine as said engine accelerates from low idle to high idle, for providing manifestations of a first time interval between first and second ones of said speed measurements and of a second time interval between third and fourth ones of said speed measurements, providing manifestations of a first average speed and a first speed difference from said first two speed manifestations, and a second average speed and a second speed difference from said second two speed manifestations, and from said manifestations of speed differences, average speeds, and time increments, providing corresponding manifestations of first and second indications of power at said average speeds, providing a manifestation of the high idle speed after the engine accelerates from low idle to high idle, and providing a manifestation of said balance point speed determined as the point of intersection of a straight line representative of said empirically-determined governor cutoff slope emanating from the zero power abscissa of the power/speed characteristic of the engine at the high idle speed, and a straight line intersecting said two power measurements at the corresponding average speeds thereof.

4. In a method of determining the balance point speed of the governor of an internal combustion engine while mounted on the engine with the engine running, the steps of:

providing an empirically-determined horsepower constant for an engine of the type under test;

providing an empirically-determined governor cutoff slope for an engine of the type under test;

accelerating the engine from a low speed to high idle speed with the engine loaded only by its own inertia, drag and accessories, and measuring speed across time increments as said engine accelerates;

providing, from said speed and time increments and said empirically-determined horsepower constant, two indications of horsepower and corresponding speeds which define two points on the increasing portion of the horsepower/speed characteristic of the engine as it accelerates;

measuring the high idle speed of the engine after it accelerates; and determining the balance point speed of the governor as the speed at which a first line defined by said two points on the horsepower/speed characteristic intersects with a second line emanating from the high idle speed point along the zero horsepower speed abscissa of the horsepower/speed characteristic of the engine and defined by said empirically-determined governor cutoff slope.

5. A method according to claim 4 wherein said accelerating step comprises: making at least two sets of measurements, each set including measurement of instantaneous speeds at opposite ends of a time interval which is short with respect to the time required for said engine to accelerate from low idle to high idle, and the duration of the related time interval.

6. Apparatus for measuring the balance point speed of the governor of an internal combustion engine with said governor mounted on the engine, while the engine is accelerated from a low idle speed to a high idle speed in a burst acceleration with the engine loaded only by its own inertia, drag and accessories, comprising:

speed sensor means, including means adapted to be disposed for sensing angular rotation of the engine, for providing a speed manifestation indicative of the rotary speed of the engine;

first means for providing a manifestation of an empirically-determined horsepower constant;

second means for providing a manifestation of an empirically-determined governor cutoff slope; and processing means operative in response to said speed manifestation with said speed sensor means disposed to sense the angular rotation of said engine and to said first and second means, for providing a plurality of indications of the instantaneous speed of the engine dispersed in time along the increasing portion of the horsepower/speed characteristic of said engine as said engine accelerates from low idle to high idle, for providing manifestations of a first time interval between first and second ones of said speed measurements and of a second time interval between third and fourth ones of said speed measurements, providing manifestations of a first average speed and a first speed difference from said first two speed manifestations and a second average speed and a second speed difference from said second two speed manifestations, and from said manifestations of speed differences, average speeds, time increments and said empirically-determined horsepower constant, providing corresponding manifestations of first and second indications of horsepower at said average speeds, providing a manifestation of the high idle speed after the engine accelerates from low idle to high idle, and providing a manifestation of said balance point speed determined as the point of intersection of a straight line representative of said empirically-determined governor cutoff slope emanating from the zero horsepower abscissa of the horsepower/speed characteristic of the engine at the high idle speed and a straight line intersecting said two horsepower measurements at the corresponding average speeds thereof.

* * * * *

UNITED STATES PATENT AND TRADEMARK OFFICE
CERTIFICATE OF CORRECTION

PATENT NO. : 4,069,707
DATED : January 24, 1978
INVENTOR(S) : James A. Cook; Henry J. Mercik, Jr.; Lee R. Armstrong It is certified that error appears in the above-identified patent and that said Letters Patent are hereby corrected as shown below:

Column 1, line 48  "accessory" should read --necessary--
Column 5, line 40  "one" should read --once--
Column 7, line 16  "counter" should read --counted--
Column 8, line 57  "roughtly" should read --roughly--
Column 9, line 24  "somwhat" should read --somewhat--
Column 9, line 44  "therefor" should read --therefore--
Column 9, line 50  "difference" should read --different--
Column 10, line 20  "Pp + MpSbp - -MgSh + MgSbp" should read --Pp + MpSbp = -MgSh + MgSbp--
Column 10, line 28  The equation "-MgSh = Pg" should be identified in the margin as equation --(5)--
Column 18, line 43  "principle" should read --principal--

Signed and Sealed this

Fifteenth Day of August 1978

[SEAL]

Attest:

RUTH C. MASON
Attesting Officer

DONALD W. BANNER
Commissioner of Patents and Trademark